United States Patent
Inches et al.

(10) Patent No.: US 9,910,718 B2
(45) Date of Patent: Mar. 6, 2018

(54) SELECTIVE LOCKING OF OPERATIONS ON JOINT AND DISJOINT SETS

(71) Applicant: LENOVO ENTERPRISE SOLUTIONS (SINGAPORE) PTE. LTD., Singapore (SG)

(72) Inventors: Brent R. Inches, Rochester, MN (US); Brian G. Holthaus, Oronoco, MN (US); Jonathan L. Kaus, Rochester, MN (US); Eric G. Thiemann, Owatonna, MN (US); Scott J. Timmerman, Rochester, MN (US); Robert W. Todd, Raleigh, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 896 days.

(21) Appl. No.: 14/159,242

(22) Filed: Jan. 20, 2014

(65) Prior Publication Data

US 2015/0207694 A1   Jul. 23, 2015

(51) Int. Cl.

| G06F 15/173 | (2006.01) |
| --- | --- |
| G06F 9/52 | (2006.01) |
| H04L 12/24 | (2006.01) |
| H04L 12/933 | (2013.01) |
| G06F 9/455 | (2018.01) |

(52) U.S. Cl.
CPC .......... *G06F 9/524* (2013.01); *G06F 9/45558* (2013.01); *H04L 41/24* (2013.01); *H04L 49/15* (2013.01); *G06F 2009/45595* (2013.01); *H04L 41/08* (2013.01)

(58) Field of Classification Search
CPC ................ G06F 9/954; G06F 9/45558; G06F 2009/45595; H04L 49/15; H04L 67/10; H04L 41/24
USPC ............................... 709/223, 22, 200, 217.3
See application file for complete search history.

(56) References Cited

U.S. PATENT DOCUMENTS

| 6,681,226 | B2 | 1/2004 | Bretl et al. |
| --- | --- | --- | --- |
| 7,508,397 | B1 | 3/2009 | Molnar et al. |
| 8,018,943 | B1 | 9/2011 | Pleshek et al. |
| 8,977,733 | B1 * | 3/2015 | Phuong ............... H04L 41/0813 709/220 |
| 2005/0157461 | A1 * | 7/2005 | Cauthron ............ H05K 7/1488 361/724 |
| 2006/0095668 | A1 * | 5/2006 | Day .................... G06F 12/0848 711/118 |
| 2009/0010252 | A1 * | 1/2009 | Tsang ................... H04L 49/552 370/389 |

(Continued)

FOREIGN PATENT DOCUMENTS

WO    2009042257 A2    4/2009

*Primary Examiner* — El Hadji Sall
(74) *Attorney, Agent, or Firm* — Patterson + Sheridan, LLP

(57) ABSTRACT

A management controller in a distributed network switch may operate on sets of ports such that sets of ports containing a same port are processed serially, and sets that do not contain any of the same ports can be processed in parallel. When receiving a set of ports for processing, the management controller organizes the ports into lanes that each correspond to a unique port. If any of the lanes overlap, subsequent port sets are blocked from proceeding until the lanes of preceding port sets are cleared. If no lanes overlap, the sets may be deemed disjoint, and subsequent port sets may be processed in parallel.

20 Claims, 7 Drawing Sheets

(56) References Cited

U.S. PATENT DOCUMENTS

| | | |
|---|---|---|
| 2012/0045204 A1 | 2/2012 | Beshai |
| 2012/0307838 A1 | 12/2012 | Manula et al. |
| 2013/0081061 A1* | 3/2013 | Dice .................. G06F 9/52 |
| | | 719/314 |
| 2013/0208728 A1* | 8/2013 | Armstrong .............. H04L 45/44 |
| | | 370/401 |
| 2013/0329577 A1* | 12/2013 | Suzuki .................. H04L 12/54 |
| | | 370/252 |

* cited by examiner

SELECTIVE LOCKING OF OPERATIONS ON JOINT AND DISJOINT SETS

BACKGROUND

Embodiments of the present disclosure generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

BRIEF SUMMARY

Embodiments of the present disclosure provide a computer-implemented method for managing a shared resource comprising a plurality of objects. The method includes receiving a first operation specifying a first set of objects of the plurality of objects, and inserting the first operation in a queue comprising a plurality of lanes corresponding to the plurality of objects. The lanes that correspond to the first set of objects receive a first entry associated with the first set of objects. The method further includes performing the first operation on the first set of objects, and receiving a second operation specifying a second set of objects of the plurality of objects. The method includes inserting the second operation in the queue, wherein the lanes that correspond to the second set of objects receive a second entry associated with the second set of objects. The method includes determining whether at least one of the lanes that correspond to the second set of objects contains the first entry associated with the first set of objects that precedes the second entry. The method includes, responsive to determining none of the lanes that correspond to the second set of objects contains the first entry that precedes the second entry, performing, by operation of one or more processors, the second operation on the second set of objects in parallel with the first operation.

Embodiments of the present disclosure further provide a computer program product and a system for performing an operation for managing a distributed network switch having a plurality of ports. The operation includes receiving a first operation specifying a first set of ports of the plurality of ports, and inserting the first operation in a queue comprising a plurality of lanes corresponding to the plurality of ports. The lanes that correspond to the first set of ports receive a first entry associated with the first set of ports. The operation further includes performing the first operation on the first set of ports, and receiving a second operation specifying a second set of ports of the plurality of ports. The operation includes inserting the second operation in the queue, wherein the lanes that correspond to the second set of ports receive a second entry associated with the second set of ports. The operation further includes determining whether at least one of the lanes that correspond to the second set of ports contains the first entry associated with the first set of ports that precedes the second entry. The operation includes, responsive to determining none of the lanes that correspond to the second set of ports contains the first entry that precedes the second entry, performing the second operation on the second set of ports in parallel with the first operation.

BRIEF DESCRIPTION OF THE SEVERAL VIEWS OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this present disclosure and are therefore not to be considered limiting of its scope, for the present disclosure may admit to other equally effective embodiments.

FIGS. 4A-4J are block diagrams depicting example operations on a plurality of ports, according to embodiments of the present disclosure.

Figure 1:
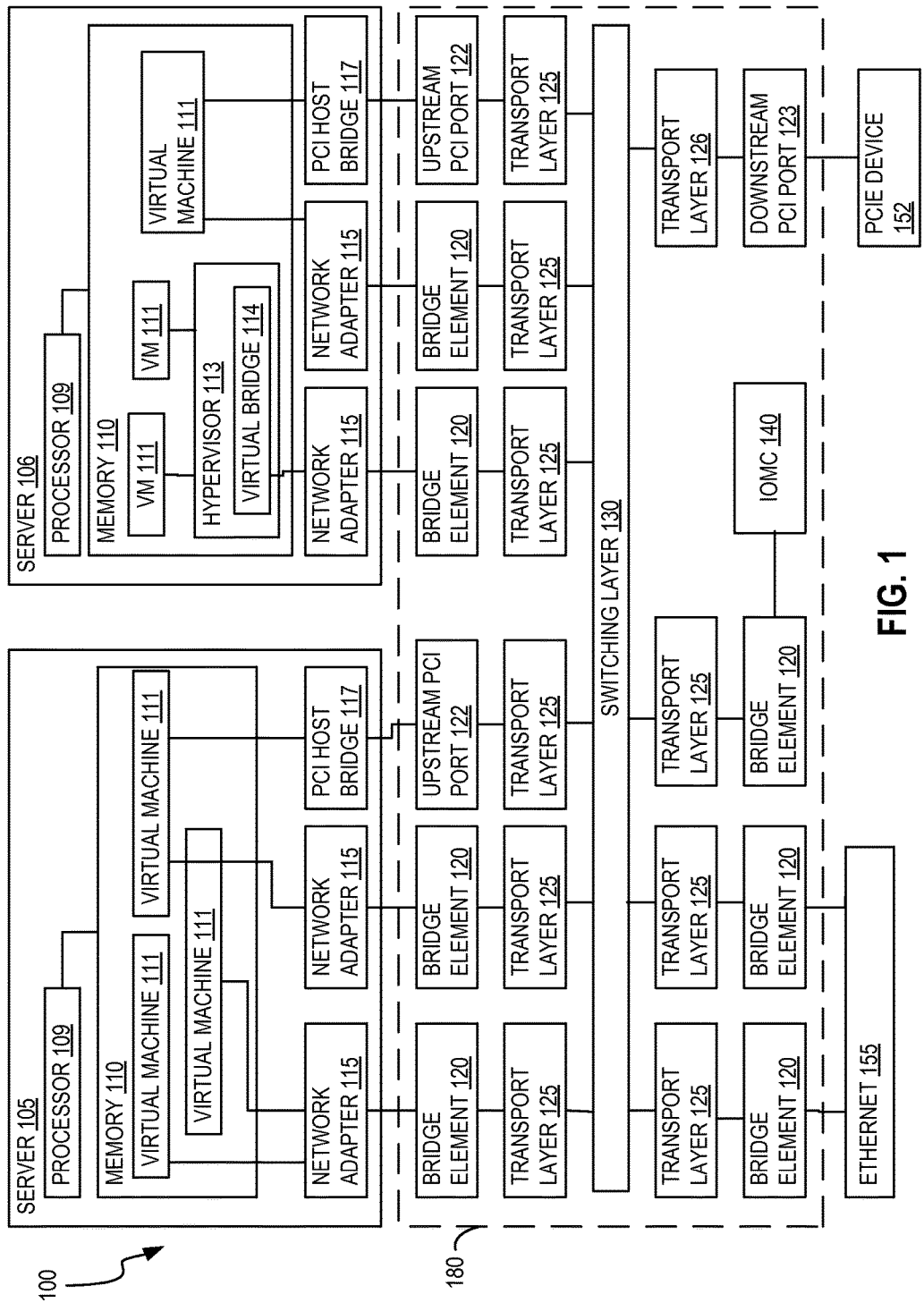
FIG. 1 illustrates a system architecture that includes a distributed network switch, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the following, reference is made to embodiments of the present disclosure. However, it should be understood that the disclosure is not limited to specific described embodiments. Instead, any combination of the following features and elements, whether related to different embodiments or not, is contemplated to implement and practice aspects of the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Referring now to FIG. 1, FIG. 1 illustrates a system architecture 100 that includes a distributed network switch 180, according to one embodiment of the present disclosure. The computer system 100 includes first and second servers 105, 106 connected to the distributed network switch 180. In one embodiment, the first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105. The server 105 may operate under the control of an operating system (not shown) and execute various computer software applications, components, programs, objects, modules, and data structures, such as virtual machines 111.

The server 105 may include network adapters 115, sometimes referred to as converged network adapters (CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fibre Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the distributed network switch, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

As shown in FIG. 1, the second server 106 may include a processor 109 coupled to a memory 110 which includes one or more virtual machines 111 similar to those found in the first server 105. The memory 110 of server 106 may include a hypervisor 113 configured to manage data shared between different virtual machines 111. The hypervisor 113 may include a virtual bridge 114 that allows direct communication between connected virtual machines 111 rather than requiring the virtual machines 111 to use the bridge elements 120 or switching layer 130 to transmit data to other virtual machines 111 communicatively coupled to the hypervisor 113.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that are coupled to one of the bridge elements 120, also referred to herein as bridging elements. Additionally, to facilitate PCIe communication, the server may have a PCI Host Bridge 117. The PCI Host Bridge 117 may connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCIe device 152.

The distributed network switch 180 includes a plurality of bridge elements 120 that may be located on a plurality of a separate, though interconnected, hardware components. In one embodiment, the bridge elements 120 may be configured to forward data frames throughout the distributed network switch 180. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180. From the perspective of the network adapters 115, the distributed network switch 180 acts like one single switch even though the distributed network switch 180 may be composed of multiple switches that are physically located on different components, such as on different chassis or racks. Distributing the operations of the network switch 180 into multiple bridge elements 120 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

In one embodiment, the switching layer 130 may comprise a local rack interconnect (LRI) which connects bridge elements 120 located within the same chassis and rack, as well as links that connect to bridge elements 120 in other chassis and racks. After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 152. The PCIe device 152 may be a passive backplane interconnect, as an expansion card interface for add-in boards, or common storage that can be accessed by any of the servers connected to the distributed network switch 180.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, IOMCs 140 may be arranged in a hierarchy such that one IOMC 140 is chosen as a master while the others are delegated as members. In another embodiment, the IOMCs 140 may be arranged in a peer-to-peer layout where the IOMCs 140 collaborate to administer and manage the elements of the distributed network switch 180.

Figure 2:
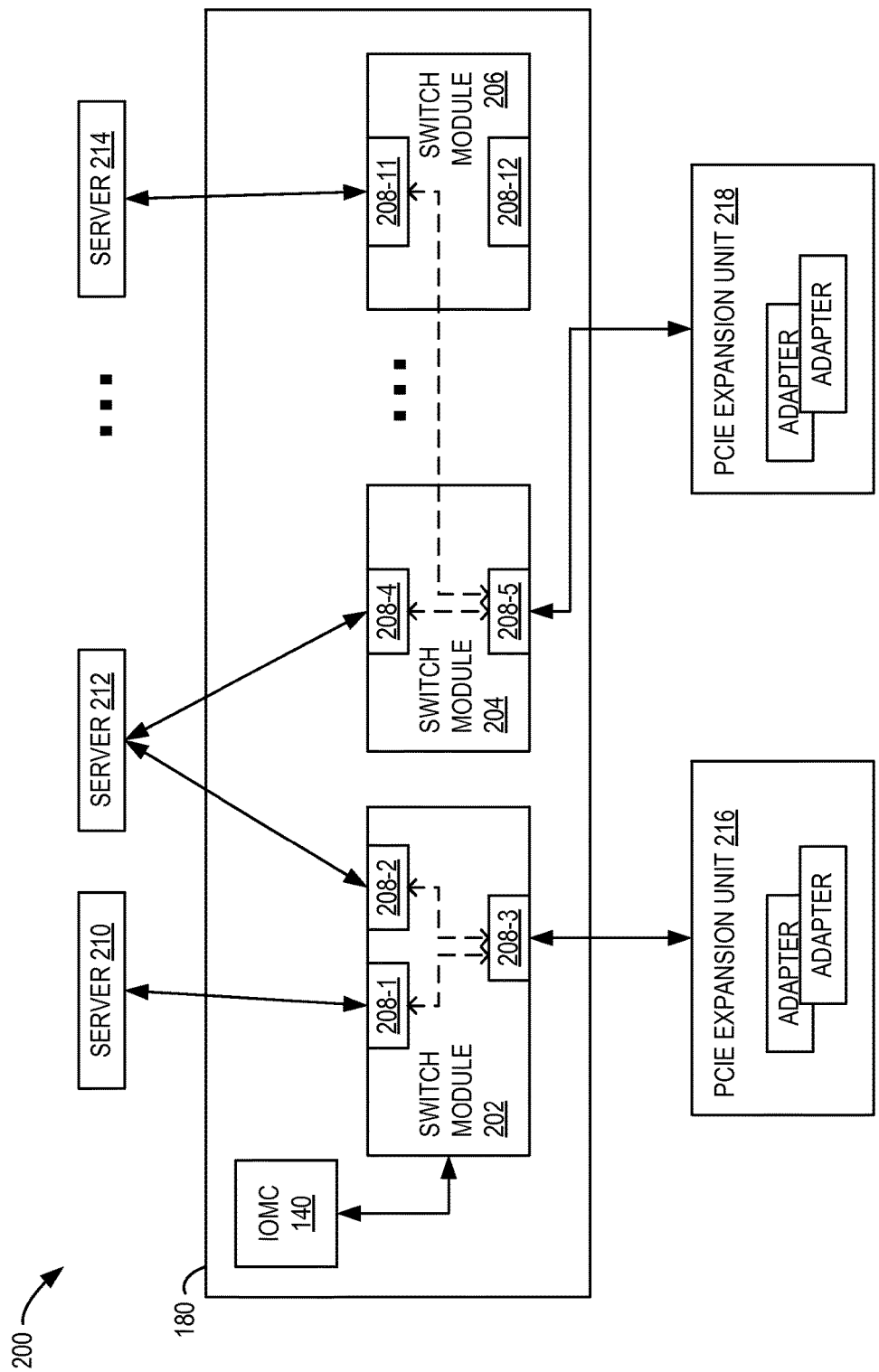
FIG. 2 illustrates a hardware representation of a system that implements a distributed network switch, according to one embodiment of the present disclosure.

FIG. 2 illustrates a hardware representation of a system 200 that implements the distributed network switch 180, according to one embodiment of the present disclosure. As shown, the system 200 includes a distributed network switch 180 having a plurality of switch modules 202, 204, 206 and one or more IOMCs 140. The switch modules may include a logical or physical grouping of the bridge elements 120 shown in FIG. 1. The switch modules 202, 204, 206, also referred to as a chassis interconnect elements (CIE), are hardware components (e.g., PCB boards, FPGA boards, system on a chip, etc.) that provide physical support and connectivity between the network adapters of the servers 210, 212, 214 and the bridge elements 120 contained within the switch modules 202, 204, 26. The switch modules 202, 204, 206 may be interconnected by a switching layer 130, described above. In some embodiments, a switch module may route data sent using either Ethernet or PCI communication protocols to other switch modules within the distributed network switch 180.

In one or more embodiments, the switch modules 202, 204, 206 include one or more ports 208 (e.g., 208-1, 208-2, 208-3, . . . , 208-11, 208-12) that are used to route traffic between devices connected to the switch modules. In some embodiments, each of the ports 208 may be assigned a unique identifier, e.g., port "1", port "2", etc, that identifies the port within the distributed network switch 180. The ports 208 may be configured similarly to the ports 122, 123 of FIG. 1, and may be characterized as "upstream" ports (i.e., host-side) that connect to one of servers 210, 212, 214 or as "downstream" ports (i.e., adapter-side) that connect to one or more devices (e.g., PCIe devices 152) that expands the connectivity or capabilities of the system 200. In some embodiments, the distributed network switch 180 may act as a PCIe switch fabric that enables servers 210, 212, 214 connected at upstream ports 208 of the distributed network switch to access PCIe devices connected at the downstream ports. In the embodiment shown, one or more PCIe expansion units 216, 218 are connected to the downstream ports and may provide, for example, additional storage or memory which each server 210, 212, 214 may access via the switch modules.

In some embodiments, the ports 208 may be connected to each other in various different configurations, as well as different settings (e.g., speed, bandwidth, direction, etc.) for routing PCIe traffic between servers 210, 212, 214 and PCIe expansion units 216, 218. For example, an upstream port of a switch module may be connected to a downstream port of the switch module, as shown by the data path connecting the port 208-4 to the port 208-5 of the switch module 204. In another example, multiple upstream ports of a switch module may be connected to a single downstream port of the same switch module, as depicted by the data path connecting ports 208-1, 208-2 of the switch module 202 to the downstream port 208-3. In yet another example, an upstream port of a switch module may be connected to a downstream port of a different switch module within the distributed network switch, as shown by the data path connecting the port 208-11 of the switch module 206 and the port 208-5 of the switch module 204. In some cases, a port of a switch module may even be in-active or disconnected from any device at a given point in time, as depicted by the port 208-12.

In one embodiment, the distributed network switch includes a management controller, referred to herein as an IOMC 140, for managing and configuring the different hardware resources in the system 200. While FIG. 2 depicts a single IOMC 140 within the distributed network switch 180, it should be recognized that each switch module may include a respective IOMC responsible for managing one or more corresponding switch modules. The IOMC 140 may be configured to perform one or more connection, configuration, and other management-related operations on a set of ports 208.

For example, the IOMC may perform a connection operation on a set of ports 208 that connects upstream and downstream ports in the same switch module (e.g., 202) or in different switch modules (e.g., 202 and 204) with various different configurations, described above. In another example, the IOMC may perform a configuration operation on a set of ports 208 that configures settings such as connection speed, bandwidth, port orientation (e.g., upstream/downstream), and activated/inactivated status. In many cases, each port 208 may be operated on by a single process at a given time. Conventional locking mechanisms lock every port set and process the port sets serially, which can be inefficient and costly in time and computing resources.

Accordingly, embodiments described herein provide a technique for performing operations on a target set of ports, where multiple sets of ports are queued while waiting for processing. In one or more embodiments, when a set of ports is passed into the IOMC code to be processed, the set of ports will be organized into "lanes," with each lane corresponding to a unique port. If any of the lanes overlap, subsequent port sets may be blocked from proceeding until the preceding lanes are cleared. If no lanes overlap, subsequent port sets may be allowed to be processed in parallel.

Some sets to be processed may contain one or more of the same port (i.e., there exists a particular port in common between the sets), and are referred to herein as "joint" sets. Some sets to be processed may contain none of the same ports (i.e., there exists no particular port in common between the sets), and are referred to herein as "disjoint" sets. According to embodiments described herein, joint sets are processed serially with subsequent sets waiting for a prior set to complete, and disjoint sets are processed in parallel, thereby greatly increasing throughput of processing. While techniques of the present disclosure are described in relation to performing operations on sets of operations, it should be recognized that aspects of the present disclosure may be extended to operations on any set of objects or shared resources, particularly operations that require a set of shared resources to be operated on at once.

Figure 3:
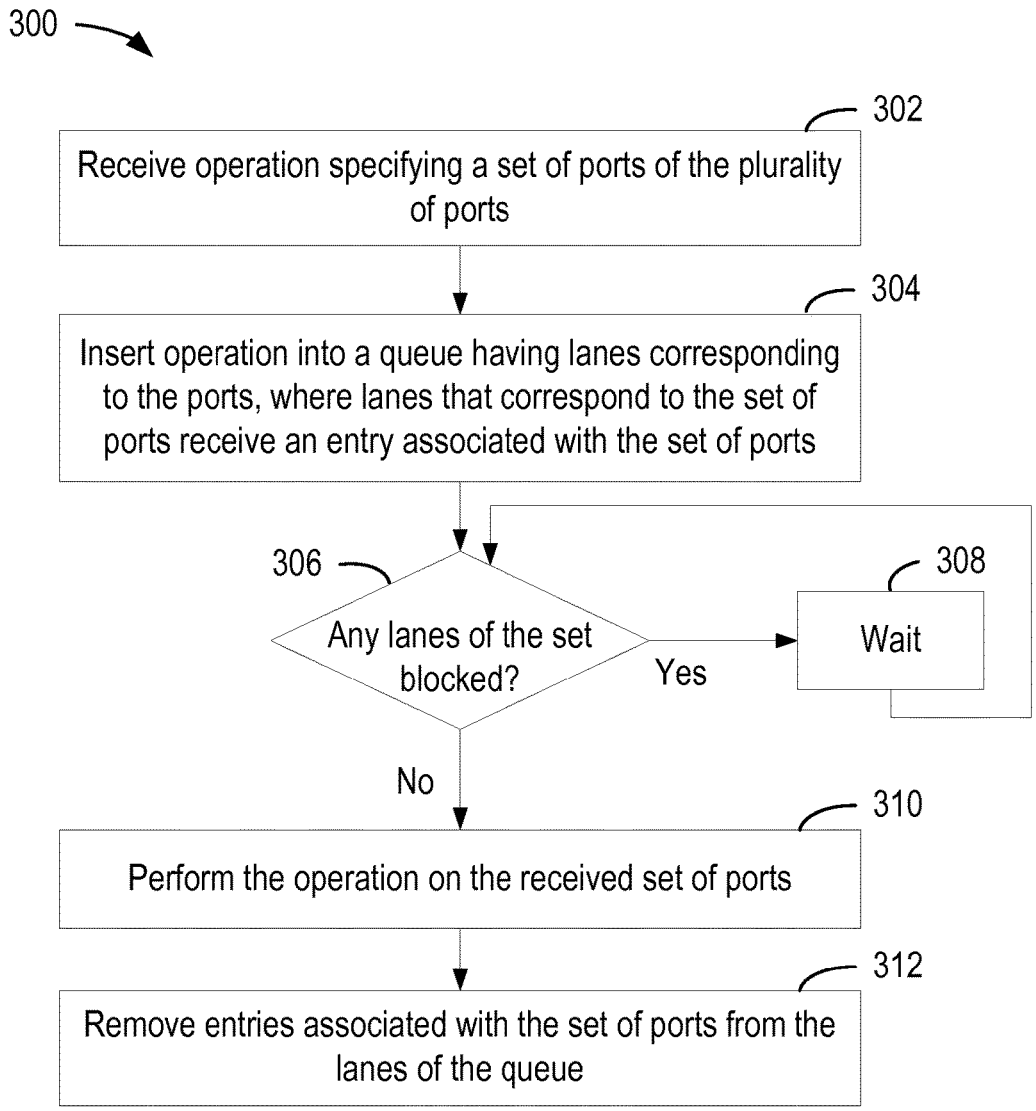
FIG. 3 is a flow diagram depicting a method for managing a distributed network switch having a plurality of ports, according to one embodiment of the present disclosure.

FIG. 3 is a flow diagram depicting a method 300 for managing switch modules of a distributed network switch, according to one embodiment of the present disclosure. As shown, the method 300 begins at block 302, the IOMC 140 receives an operation specifying a set of ports of the plurality of ports. In some embodiments, the operation may specify the set of ports using the unique port identifiers (e.g., port "0", port "11") assigned to each port within the distributed network switch.

At block 304, the IOMC inserts the received operation into a queue having a plurality of lanes, where each lane corresponds to a unique port. The lanes that correspond to the set of ports specified for the operation receive an entry associated with the set of ports. In some embodiments, the entries in the lanes associated with the set of ports may be linked by a common identifier, such as a set identifier. In one implementation, each lane of the queue may be represented by a data structure stored in a memory of the IOMC and managed by the IOMC.

At block 306, the IOMC determines whether any lanes corresponding to the set of ports are blocked. A lane is blocked for a given set if the lane contains an entry from a preceding set of ports, for example, from another operation received prior to block 302. The preceding set of ports may either be also waiting in the queue, or are being currently processed (and therefore locked). In one embodiment, the IOMC determines whether any of the lanes that correspond to the set of ports for the received operation contains a preceding entry, i.e., an entry that is "ahead" of the entry associated with the received operation. If so, the set of ports is deemed a joint set in relation to other sets of ports (associated with other operations). Conversely, responsive to determining none of the lanes that correspond to the set of ports associated with the received operation contain a preceding entry, the set of ports is deemed a disjoint set in relation to other sets of ports.

Responsive to determining any of the lanes that correspond to the set of ports associated with the received operation contains a preceding entry, at block 308, the IOMC waits until the lane queues associated with the set of ports are no longer blocked. In some embodiments, the IOMC may perform busy-waiting and loop back to block 306 to check if the state of the blocked lane queues has changed. Otherwise, at block 310, responsive to determining none of the lane queues of the set of ports is blocked (i.e., the set of ports is deemed a disjoint set), the IOMC performs the requested operation on the specified set of ports, which may include processing the specified set of ports in parallel to processing the other sets.

At block 312, upon completion of the operation on the specified set of ports, the IOMC removes the set of ports from the corresponding lane queues, thereby allowing any subsequent port sets that overlap to proceed. In some embodiments, the IOMC may remove entries associated with the processed set of ports from lanes corresponding to the processed set of ports. It should be recognized that the removal of entries from lanes of the queue may result in other sets of ports, which may have been previously blocked by the now-processed set of ports, to proceed with processing, examples of which are depicted in FIG. 4A-4J below.

Figure 4A:
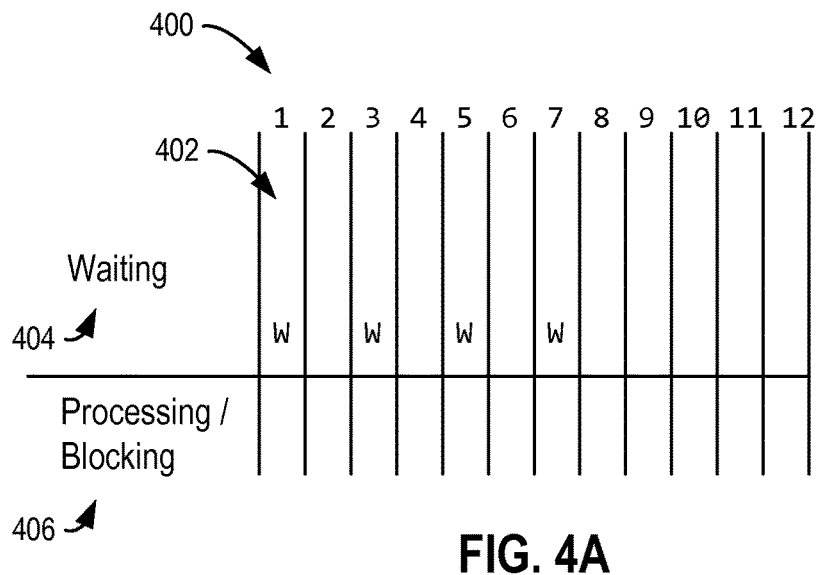

FIGS. 4A-4J are block diagrams depicting example operations on a plurality of ports, according to embodiments of the present disclosure. FIG. 4A (as well as FIGS. 4B to 4I) illustrates a queue 400 having a plurality of lanes 402 (identified as lanes "1" to "12") that each correspond to a unique port. For example, the lane "1" may correspond to a first port 208-1 of the plurality of ports 208, the lane "2" corresponds to a second port 208-2 of the plurality of ports, and so forth. FIGS. 4A to 4J depict a "Waiting" region 404 of the lane queues that represents a state in which a set of ports is waiting to be processed (i.e., due to at least one overlapping set of ports that precedes the waiting set). FIGS. 4A to 4J further depict a "Processing/Blocking" region 406 that represents a state in which a set of ports is currently being processed (e.g., by IOMC 140), and in which the set of ports may be blocking other sets of ports from being processed.

As shown in FIG. 4A, the IOMC 140 receives a first operation to be performed on a specified set W of ports {1, 3, 5, 7} of the plurality of ports {1-12}. For example, the IOMC 140 may receive instructions to perform a connection operation that establishes connections between ports 1, 3 and ports 5, 7 for routing PCIe traffic within the distributed network switch. The IOMC 140 inserts the operation into the queue 400 by inserting an entry ("W") associated with the set W of ports into the lanes 1, 3, 5, and 7 corresponding to ports 1, 3, 5, 7.

Figure 4B:
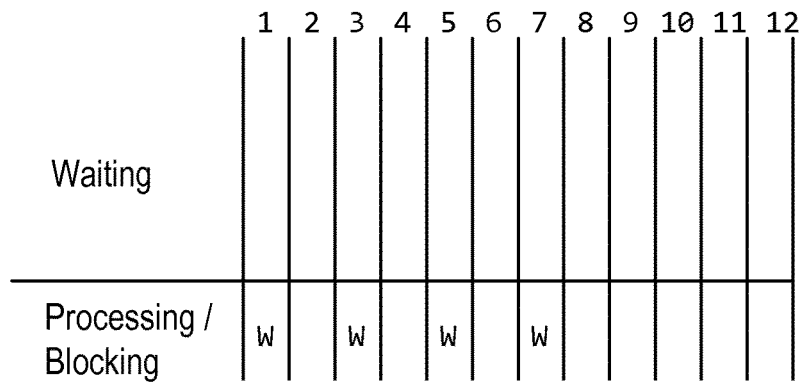

As shown in FIG. 4B, the IOMC 140 determines that none of the lanes {1, 3, 5, 7} corresponding to the specified set W of ports are blocked. As such, the IOMC 140 performs the first operation on the specified set W of ports {1, 3, 5, 7}, as represented by moving the entries W from the waiting region 404 of the lanes 1, 3, 5, and 7 to the processing/blocking region 406 of the lanes 1, 3, 5, and 7. In some embodiments, the IOMC 140 places a lock on each of the specified set of ports during performance of the operation.

Figure 4C:
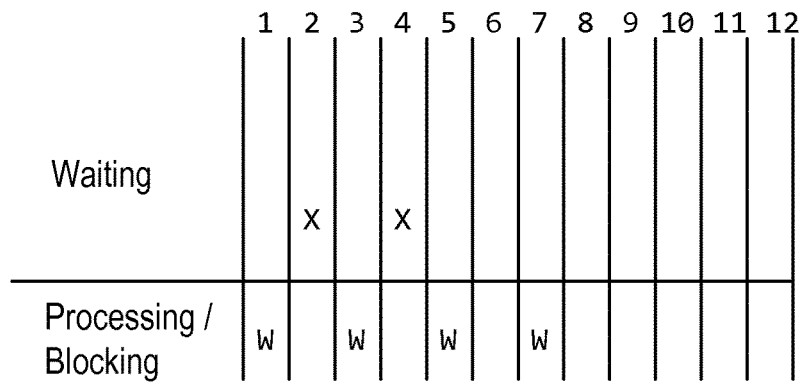

As shown in FIG. 4C, the IOMC 140 receives a second operation to be performed on a specified set X of ports {2, 4} of plurality of ports {1-12}. By way of example, the IOMC may receive instructions to perform an operation that modifies one or more configuration settings of the ports 2 and 4, such as setting a port speed of 2.5-Gbps on ports 2 and 4. The IOMC 140 inserts the second operation into the queue by inserting an entry ("X") associated with the port set X into the lanes 2 and 4 corresponding to ports 2 and 4.

Figure 4D:
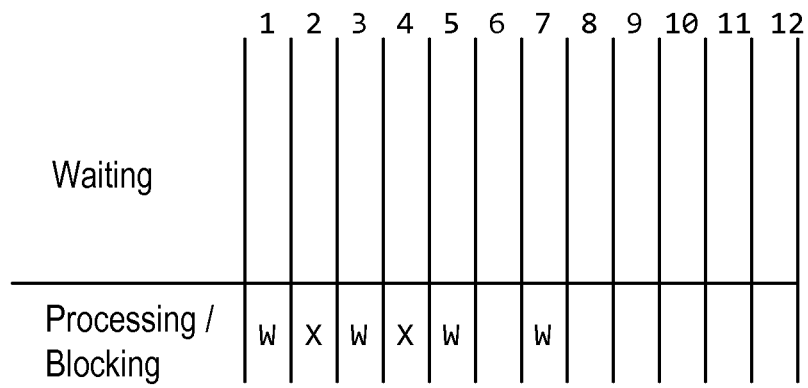

As shown in FIG. 4D, the IOMC 140 determines that none of the lanes {2, 4} having the entry X are blocked, i.e., are preceded by another entry associated with other sets of ports. Specifically, none of the lanes {2, 4} contains a preceding entry associated with the set W of ports from the earlier-received first operation. As such, the IOMC 140 may perform the second operation on the specified set X of ports {2, 4} in parallel with the first operation on the set W of ports. Performance of the second operation is represented in FIG. 4D by moving the entries X from the waiting region 404 of the lanes 2 and 4 to the processing/blocking region 406 of the lanes 2 and 4, which still contains the entries W, representing processing the port set W while processing the port set X.

Figure 4E:
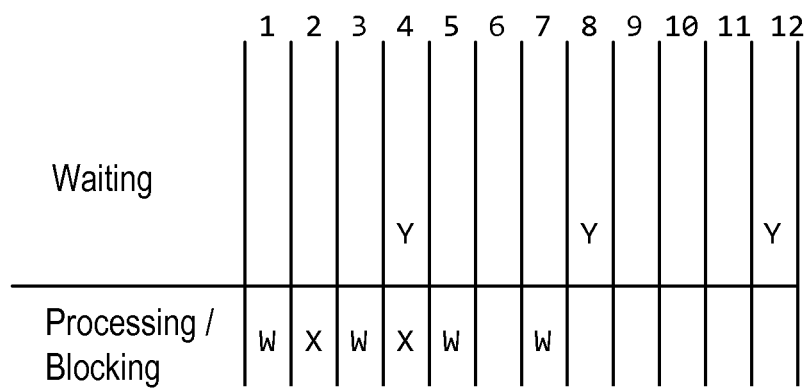

As shown in FIG. 4E, the IOMC 140 receives a third operation to be performed on a specified set Y of ports {4, 8, 12} of the plurality of ports. The IOMC 140 inserts the third operation into the queue by adding an entry ("Y") associated with the port set Y into lanes 4, 8, and 12 corresponding to the ports 4, 8, and 12. The IOMC 140 determines that at least one of the lanes associated with the port set Y contains a preceding entry associated with another port set, and therefore waits to execute the third operation. In the example shown, the port set Y is blocked because lane 4 contains a preceding entry associated with the port set X and currently being processed.

Figure 4F:
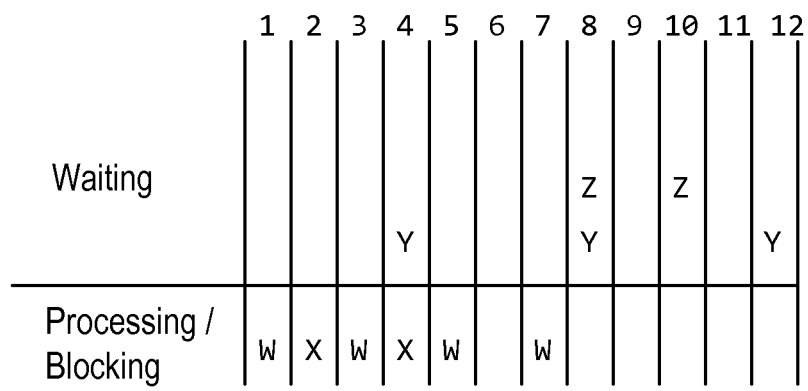

As shown in FIG. 4F, the IOMC 140 receives a fourth operation to be performed on a specified set Z of ports {8, 10} and inserts the fourth operation into the queue, as depicted by the lanes 8 and 10 (corresponding to ports 8 and 10) receiving an entry ("Z") associated with the port set Z. The IOMC determines that at least one lane among the lanes 8 and 10 associated with the port set Z contains an entry preceding the entry Z, and waits to execute the fourth operation. Specifically, the lane 8 contains an entry associated with port set Y that precedes the entry associated with the port set Z. It should be recognized that, even though none of the lanes associated with port sets W and X (i.e., lanes 1, 2, 3, 4, 5, 7) overlap with the lanes {8, 10} associated with the port set Z, the fourth operation Z awaits processing because the fourth operation is blocked by the port set Y.

Figures 4G, 4H, 4I:
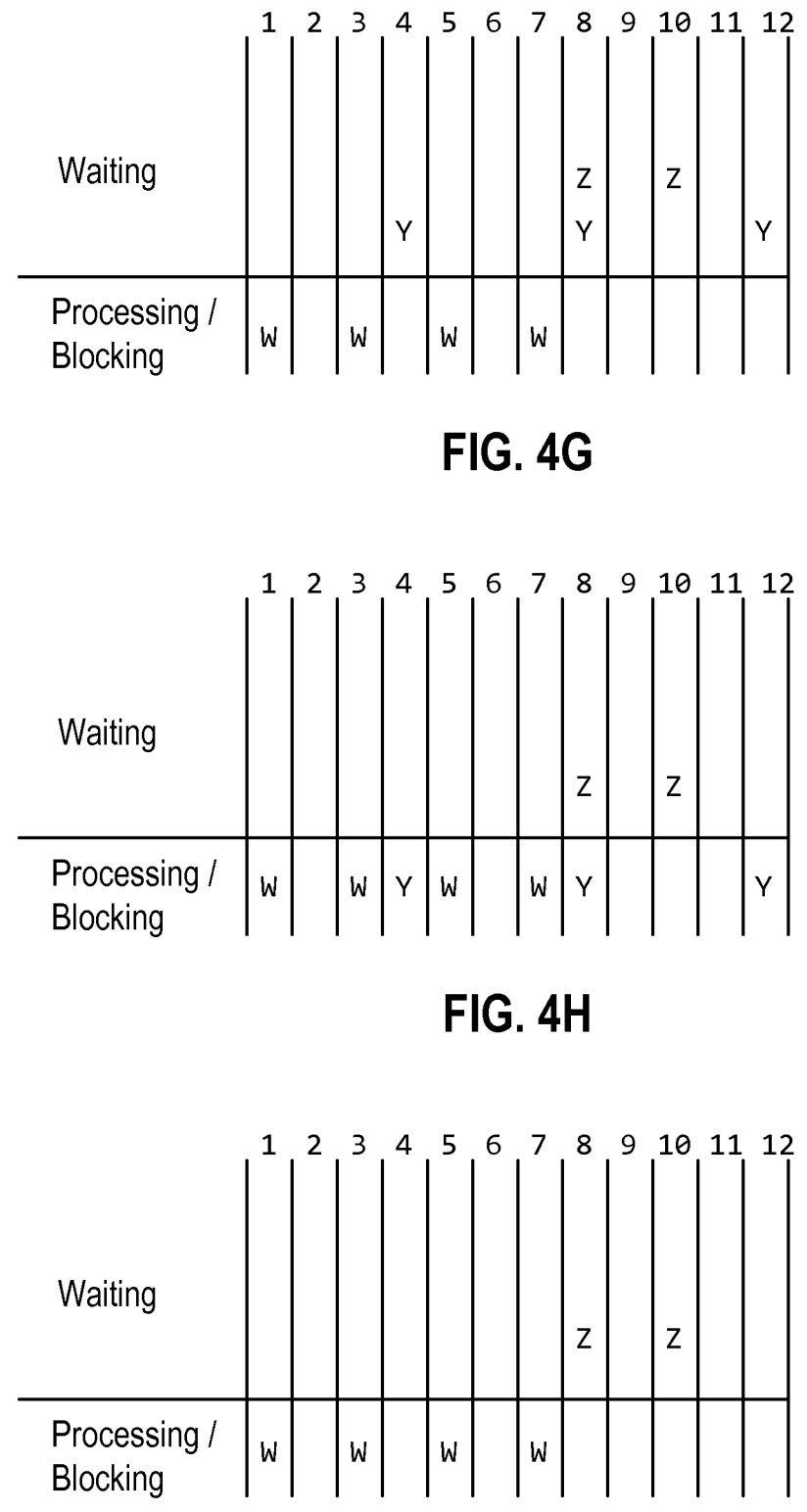

As shown in FIG. 4G, the IOMC 140 completes the second operation specifying the set X of ports and removes entries associated with the set X of ports from the lanes of the queue. FIG. 4G illustrates the entries X removed from the processing/blocking region 406 of the lanes 2 and 4, representing the processing of port set X has been completed. It should be recognized the first set W of ports may still be processing during this time, and lanes containing the port set W remain blocked.

As shown in FIG. 4H, responsive to determining that the lanes that correspond to the set Y of ports are no longer have preceding entries, i.e., are no longer blocked, the IOMC 140 proceeds to perform the third operation and processes the set Y of ports. The entries Y contained in lanes 4, 8, and 12 are moved from the waiting region 404 to the processing/blocking region 406. The entries Z contained in lanes 8 and 10 move to the head of the queue and continue to wait to be processed because lane 8 is occupied by the port set Y being processed.

Figure 4J:
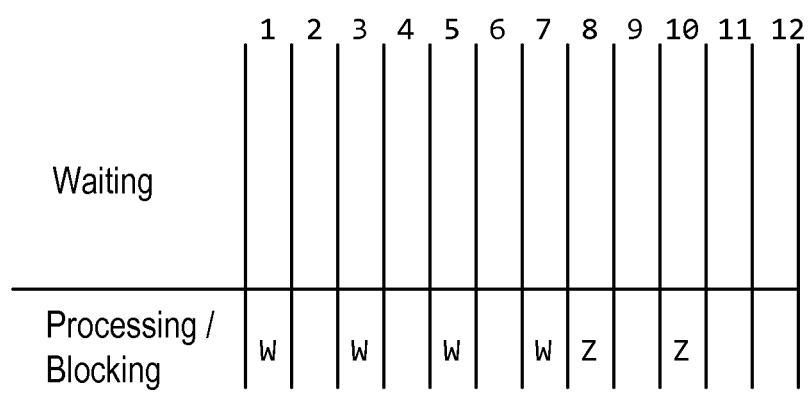

As shown in FIG. 4I, the IOMC 140 completes the third operation specifying the set Y of ports and removes the entries associated with the port set Y from the lanes of the queue, specifically, lanes 4, 8, and 12. After the port set Y has completed processing, the IOMC 140 may proceed to process the port set Z as the next entry within the queue 400 not having any blocked lanes, as shown in FIG. 4J. While the queue 400 is described herein applying a first-in-first-out (FIFO) order for selecting a next set of ports to process, it should be recognized that other scheduling policies may be used, such as a priority queue having dynamically determined priorities associated with one or more lanes.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A computer program product for managing a distributed network switch having a plurality of ports, the computer program product comprising:
    a non-transitory computer-readable storage medium having computer-readable program code embodied therewith, the computer-readable program code comprising:
        computer-readable program code, executable by a processor, configured to receive a first operation specifying a first set of ports of the plurality of ports;
        computer-readable program code configured to insert the first operation in a queue comprising a plurality of lanes corresponding to the plurality of ports, wherein the lanes that correspond to the first set of ports receive a first entry associated with the first set of ports;
        computer-readable program code configured to perform the first operation on the first set of ports;
        computer-readable program code configured to receive a second operation specifying a second set of ports of the plurality of ports;
        computer-readable program code configured to insert the second operation in the queue, wherein the lanes that correspond to the second set of ports receive a second entry associated with the second set of ports;
        computer-readable program code configured to determine whether at least one of the lanes that correspond to the second set of ports contains the first entry associated with the first set of ports that precedes the second entry; and
        computer-readable program code configured to, responsive to determining none of the lanes that correspond to the second set of ports contains the first entry that precedes the second entry, perform the second operation on the second set of ports in parallel with the first operation.

2. The computer program product of claim 1, further comprising:
    computer-readable program code configured to, responsive to determining at least one of the lanes that correspond to the second set of ports contains the first entry that precedes the second entry, wait until completion of the first operation to perform the second operation.

3. The computer program product of claim 1, further comprising:
    computer-readable program code configured to, responsive to completion of the first operation, remove the first entry associated with the first set of ports from the lanes of the queue; and
    computer-readable program code configured to perform the second operation.

4. The computer program product of claim 3, further comprising:
    computer-readable program code configured to receive a third operation specifying a third set of ports, wherein the third set of ports is disjoint from the first set of ports;
    computer-readable program code configured to insert the third operation in the queue, wherein the lanes that correspond to the third set of ports receive a third entry associated with the third set of ports; and
    computer-readable program code configured to, responsive to determining at least one of the lanes that correspond to the third set of ports contains a preceding entry, wait until the preceding entry is removed from the lane to perform the third operation.

5. The computer program product of claim 1, wherein the first operation comprises an operation to establish a connection between an upstream port of the plurality of ports and a downstream port of the plurality of ports.

6. The computer program product of claim 1, wherein the first operation comprises an operation to modify a configuration setting of the first set of ports.

7. The computer program product of claim 1, wherein at least one of the plurality of ports is configured for establishing connections according to a predefined interface comprising a Peripheral Component Interconnect (PCI) Express interface.

8. An apparatus comprising:
    a plurality of switch modules having a plurality of ports, each switch module having at least one port for establishing connections according to a predefined interface;
    a computer processor; and
    a memory storing management firmware, which, when executed on the computer processor, performs an operation comprising:
        receiving a first operation specifying a first set of ports of the plurality of ports;
        inserting the first operation in a queue comprising a plurality of lanes corresponding to the plurality of ports, wherein the lanes that correspond to the first set of ports receive a first entry associated with the first set of ports;
        performing the first operation on the first set of ports;
        receiving a second operation specifying a second set of ports of the plurality of ports;
        inserting the second operation in the queue, wherein the lanes that correspond to the second set of ports receive a second entry associated with the second set of ports;
        determining whether at least one of the lanes that correspond to the second set of ports contains the first entry associated with the first set of ports that precedes the second entry; and
        responsive to determining none of the lanes that correspond to the second set of ports contains the first entry that precedes the second entry, performing the second operation on the second set of ports in parallel with the first operation.

9. The apparatus of claim 8, wherein the operation further comprises:
    responsive to determining at least one of the lanes that correspond to the second set of ports contains the first entry that precedes the second entry, waiting until completion of the first operation to perform the second operation.

10. The apparatus of claim 8, wherein the operation further comprises:

responsive to completion of the first operation, removing the first entry associated with the first set of ports from the lanes of the queue; and performing the second operation.

11. The apparatus of claim 10, wherein the operation further comprises:

receiving a third operation specifying a third set of ports, wherein the third set of ports is disjoint from the first set of ports;

inserting the third operation in the queue, wherein the lanes that correspond to the third set of ports receive a third entry associated with the third set of ports; and responsive to determining at least one of the lanes that correspond to the third set of ports contains a preceding entry, waiting until the preceding entry is removed from the lane to perform the third operation.

12. The apparatus of claim 8, wherein the first operation comprises an operation to establish a connection between an upstream port of the plurality of ports and a downstream port of the plurality of ports.

13. The apparatus of claim 8, wherein the predefined interface is a Peripheral Component Interconnect (PCI) Express interface.

14. A computer-implemented method for managing a shared resource comprising a plurality of objects, the method comprising:

receiving a first operation specifying a first set of objects of the plurality of objects;

inserting the first operation in a queue comprising a plurality of lanes corresponding to the plurality of objects, wherein the lanes that correspond to the first set of objects receive a first entry associated with the first set of objects;

performing the first operation on the first set of objects;

receiving a second operation specifying a second set of objects of the plurality of objects;

inserting the second operation in the queue, wherein the lanes that correspond to the second set of objects receive a second entry associated with the second set of objects;

determining whether at least one of the lanes that correspond to the second set of objects contains the first entry associated with the first set of objects that precedes the second entry; and responsive to determining none of the lanes that correspond to the second set of objects contains the first entry that precedes the second entry, performing, by operation of one or more processors, the second operation on the second set of objects in parallel with the first operation.

15. The method of claim 14, further comprising responsive to determining at least one of the lanes that correspond to the second set of objects contains the first entry that precedes the second entry, waiting until completion of the first operation to perform the second operation.

16. The method of claim 14, further comprising:

responsive to completion of the first operation, removing the first entry associated with the first set of objects from the lanes of the queue; and performing the second operation serially with the first operation.

17. The method of claim 16, further comprising:

receiving a third operation specifying a third set of objects, wherein the third set of objects is disjoint from the first set of objects;

inserting the third operation in the queue, wherein the lanes that correspond to the third set of objects receive a third entry associated with the third set of objects; and responsive to determining at least one of the lanes that correspond to the third set of objects contains a preceding entry, waiting until the preceding entry is removed from the lane to perform the third operation.

18. The method of claim 14, wherein the plurality of objects comprises a plurality of ports of a distributed network switch, each port configured for establishing connections according to a predefined interface.

19. The method of claim 18, wherein the first operation comprises an operation to establish a connection between an upstream port of the plurality of ports and a downstream port of the plurality of ports.

20. The method of claim 18, wherein the first operation comprises an operation to modify a configuration setting of the first set of ports.

\* \* \* \* \*